US008068517B2

(12) United States Patent
Kang et al.

(10) Patent No.: US 8,068,517 B2
(45) Date of Patent: Nov. 29, 2011

(54) DIGITAL E8-VSB RECEPTION SYSTEM AND E8-VSB DATA DEMULTIPLEXING METHOD

(75) Inventors: Kyung Won Kang, Seoul (KR); In Hwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 12/546,490

(22) Filed: Aug. 24, 2009

(65) Prior Publication Data

US 2009/0310014 A1   Dec. 17, 2009

Related U.S. Application Data

(63) Continuation of application No. 10/995,768, filed on Nov. 22, 2004, now Pat. No. 7,599,348, which is a continuation-in-part of application No. 10/701,916, filed on Nov. 4, 2003, now Pat. No. 7,450,613.

(30) Foreign Application Priority Data

Nov. 24, 2003  (KR) .................. 10-2003-0083688

(51) Int. Cl.
  *H04J 3/04* (2006.01)
(52) U.S. Cl. .................. 370/535; 348/423.1; 348/425.2
(58) Field of Classification Search ............... 348/423.1, 348/425.2, 726; 370/535, 350; 375/232, 375/240.27, 265, 301, 346
  See application file for complete search history.

(56) References Cited

U.S. PATENT DOCUMENTS

| 5,087,975 A | 2/1992 | Citta et al. |
| 5,233,630 A | 8/1993 | Wolf |
| 5,488,691 A | 1/1996 | Fuoco et al. |
| 5,555,024 A | 9/1996 | Limberg |
| 5,563,884 A | 10/1996 | Fimoff et al. |
| 5,583,889 A | 12/1996 | Citta et al. |

(Continued)

FOREIGN PATENT DOCUMENTS

KR   10-2000-018531   4/2000

(Continued)

OTHER PUBLICATIONS

Fimoff, M., et al.; "E-VSB Map Signaling", IEEE Transactions on Consumer Electronics; vol. 49; Issue 3; pp. 515-518; Aug. 2003.

(Continued)

*Primary Examiner* — Jung Park
(74) *Attorney, Agent, or Firm* — Lee, Hong, Degerman, Kang & Waimey

(57) ABSTRACT

A method of processing a digital television (DTV) signal is disclosed. Herein, the DTV signal is generated by performing Reed-Solomon (RS) encoding on additional data, multiplexing the RS-encoded additional data with main data. RS encoding the multiplexed additional and main data, interleaving the RS-encoded additional and main data, trellis encoding the interleaved additional and main data, and transmitting a Radio Frequency (RF) DTV signal including the trellis-encoded additional and main data. The method to process the DTV signal includes receiving the DTV signal including the additional data multiplexed with the main data through an antenna, in which signaling information is periodically inserted in the additional data. The received DIV signal is demodulated including performing channel equalization on the demodulated DTV signal. Trellis decoding is performed on the channel-equalized DIV signal. Further, the additional data from the trellis-decoded DTV signal is extracted including removing dummy data from the extracted additional data.

6 Claims, 17 Drawing Sheets

U.S. PATENT DOCUMENTS

| | | |
|---|---|---|
| 5,600,677 A | 2/1997 | Citta et al. |
| 5,602,595 A | 2/1997 | Citta et al. |
| 5,619,269 A | 4/1997 | Lee et al. |
| 5,619,298 A | 4/1997 | Stiehler |
| 5,629,958 A | 5/1997 | Willming |
| 5,636,251 A | 6/1997 | Citta et al. |
| 5,636,252 A | 6/1997 | Patel et al. |
| 5,706,312 A | 1/1998 | Wei |
| 5,831,690 A | 11/1998 | Lyons et al. |
| 5,903,324 A | 5/1999 | Lyons et al. |
| 5,923,711 A | 7/1999 | Willming |
| 5,946,047 A | 8/1999 | Levan |
| 5,978,424 A | 11/1999 | Turner |
| 6,075,569 A | 6/2000 | Lee et al. |
| 6,208,643 B1 | 3/2001 | Dieterich et al. |
| 6,233,295 B1 | 5/2001 | Wang |
| 6,490,002 B1 | 12/2002 | Shintani |
| 6,671,002 B1 | 12/2003 | Konishi et al. |
| 6,690,738 B1 | 2/2004 | Swenson et al. |
| 6,697,098 B1 | 2/2004 | Wang |
| 6,708,149 B1 | 3/2004 | Turin |
| 6,724,832 B1 | 4/2004 | Hershberger |
| 6,743,025 B2 | 6/2004 | Howard |
| 6,760,077 B2 | 7/2004 | Choi et al. |
| 6,768,517 B2 | 7/2004 | Limberg et al. |
| 6,788,710 B1 | 9/2004 | Knutson et al. |
| 6,810,084 B1 | 10/2004 | Jun et al. |
| 6,924,753 B2 | 8/2005 | Bretl et al. |
| 6,927,708 B2 | 8/2005 | Fimoff |
| 7,038,732 B1 | 5/2006 | Limberg et al. |
| 7,111,221 B2 * | 9/2006 | Birru et al. ............ 714/755 |
| 2002/0001353 A1 * | 1/2002 | Citta et al. ............ 375/264 |
| 2002/0085632 A1 | 7/2002 | Choi |
| 2002/0136197 A1 | 9/2002 | Owen et al. |
| 2002/0140867 A1 | 10/2002 | Weiss |
| 2002/0191716 A1 | 12/2002 | Xia et al. |
| 2004/0057535 A1 * | 3/2004 | Strolle et al. ............ 375/340 |
| 2004/0146100 A1 * | 7/2004 | Chang et al. ............ 375/233 |
| 2004/0240590 A1 | 12/2004 | Cameron et al. |
| 2005/0281294 A1 * | 12/2005 | Gaddam et al. ............ 370/535 |

FOREIGN PATENT DOCUMENTS

| | | |
|---|---|---|
| KR | 10-2000-028757 | 5/2000 |

OTHER PUBLICATIONS

Peng, Chengyuan; "Digital Television Applications"; Doctoral Dissertation; Telecommunications Software and Multimedia Laboratory; Finland 2002.

* cited by examiner

Field sync signal ⟶

Field sync signal ⟶

FIG. 16A

For 0<=s<=311,

For 0<=p<=39,
EMAP = {s|s=4i, i=0,1,....,2P-1}

For 40<=p<=78,
EMAP = {s|s=4i, i=0,1,....,77}U
{s|s=4i+2, i=0,1,....,2P-79}

For 79<=p<=117
EMAP = {s|s=4i, i=0,1,....,77}U
{s|s=4i+2, i=0,1,....,77}U
{s|s=4i+1, i=0,1,....,2P-157}

For 79<=p<=117,
EMAP = {s|s=4i, i=0,1,....,77}U
{s|s=4i+2, i=0,1,....77}U
{s|s=4i+1, i=0,1,....77}U
{s|s=4i+3, i=0,1,....,2P-235}

FIG. 16B

```
M = round(156/P);

for k=0:2P-1
    s = k*M;
    if(s>312)then
        s=mod(s,312)+1;
    end if;
end for;
```

DIGITAL E8-VSB RECEPTION SYSTEM AND E8-VSB DATA DEMULTIPLEXING METHOD

CROSS-REFERENCE TO RELATED APPLICATIONS

This application is a continuation of U.S. patent application Ser. No. 10/995,768, filed on Nov. 22, 2004, now U.S. Pat. No. 7,599,348, which is a continuation-in-part (CIP) of U.S. patent application Ser. No. 10/701,916, filed on Nov. 4, 2003, now U.S. Pat. No. 7,450,613, and claims the benefit of earlier filing date and right of priority to Korean Patent Application No. 10-2003-0083688, filed on Nov. 24, 2003, the contents which are hereby incorporated by reference herein in their entirety.

BACKGROUND

1. Field of the Invention

The present invention relates to an enhanced 8-VSB reception system and E8-VSB data demultiplexing method, by which a plurality of enhanced data, which are encoded at different code rates and are multiplexed with MPEG data encoded by the previous ATSC 8VSB system to be transmitted, can be received.

2. Discussion of the Related Art

Generally, the United States of America (U.S.A.) has adopted the ATSC (advanced television systems committee) 8VSB (vestigial sideband) transmission system as standards for terrestrial digital broadcasting in 1995 and has started the broadcasting since 1998. The Republic of Korea has adopted the standards of the ATSC 8VSB transmission system and has started its experimental broadcasting on May, 1995. The experimental broadcasting was switched to test broadcasting systems on Aug. 31, 2000, and the regular broadcasting has been broadcasted by major broadcasting stations since October, 2001.

FIG. 1 is a block diagram of an ATSC 8VSB transmission system according to a related art. Referring to FIG. 1, an ATSC data randomizer 101 randomizes inputted MPEG video/voice data to output to a Reed-Solomon coder 102. The Reed-Solomon coder 102 performs Reed-Solomon coding on the randomized data, adds 20-byte parity code to the coded data, and then outputs the corresponding data to a data interleaver 103. The data interleaver 103 performs interleaving on the data outputted from the Reed-Solomon coder 102 to change a sequence of the data and then outputs the interleaved data to a trellis coder 104. The trellis coder 104 converts the interleaved data to symbols from bytes and then performs trellis coding on the converted data to output to a multiplexer 105. The multiplexer 105 multiplexes a trellis-coded symbol column with sync signals to output to a pilot inserter 106. The pilot inserter 106 adds a pilot signal to the multiplexed symbol column to output to a VSB modulator 107. The VSB modulator 107 modulates the symbol column outputted from the pilot inserter 106 into an 8VSB signal of an intermediate frequency band to output to an RF converter 108. And, the RF converter 108 converts the received 8VSB signal of the intermediate frequency band to an RF band signal to transmit via antenna.

The ATSC 8VSB transmission system developed for the HD (high definition) broadcast transmits MPEG-2 digital video and Dolby digital sound. Recently, as the Internet globally prevails in use, the demand for interactive broadcast is rising, and various supplementary services are requested. In order to meet such demands, many efforts are made to develop the system enabling to provide separate supplementary services as well as the MPEG-2 digital video and Dolby digital sound on the same channel.

In this case, unlike the normal video/sound data, the supplementary data such as a program execution file, stock information, and the like should be transmitted with a lower error rate. In case of the video/sound data, errors failing to be perceptible to human eyes and ears are no big deal. Yet, in case of the supplementary data, one bit error occurrence may raise a serious problem.

Hence, in a new E8-VSB transmission system compatible with the previous ATSC 8VS system, supplementary data are coded by ½ and ¼ code rates, respectively, the supplementary data are multiplexed by 164-byte packet unit according to a previously determined multiplexing format, the multiplexed data are further pre-processed to output as an MPEG transport packet format, the pre-processed enhanced data are multiplexed by 188-byte packet unit according to the previously determined multiplexing format, and the multiplexed data by 188-byte packet unit are then transmitted. Such technology has been filed by the present applicant (Korean Patent Application No. 10-2003-0017834, filed on Mar. 21, 2003).

In the applicant's previous patent application, data are divided into main data and enhanced data. The main data mean the foregoing-explained previous MPEG-2 video and Dolby digital sound data. And, the enhanced data mean ½ enhanced data coded at ½ code rate and ¼ enhanced data coded at ¼ code rate. In the applicant's previous patent application, the ½ enhanced data and the ¼ enhanced data are called ½ supplementary data and ¼ supplementary data, respectively. Yet, their meanings are identical to each other.

For convenience of explanation in the following description, as explained in applicant's previous patent application, a transmitted signal resulting from multiplexing enhanced data and main data (or normal data) is called an enhanced 8-VSB (hereinafter abbreviated E8-VSB) signal. Besides, the enhanced data and the main data can be used as the enhanced data and the main data, respectively.

FIG. 2 is a block diagram of a general ATSC 8VSB receiver.

Referring to FIG. 2, once a VSB-modulated RF signal is received via antenna, an RF tuner 201 selects an RF signal of a specific channel only by tuning and then converts it to an IF signal to output to an IF mixer 202. The IF mixer 202 downconverts the IF signal outputted from the tuner 201 to a near baseband (BB) signal to output to a demodulator 203. The demodulator 203 performs VSB demodulation on the near BB signal to output to an equalizer 204.

The equalizer 204 compensates channel distortion included in the VSB-demodulated signal to output to an 8VSB channel decoder 205. The 8VSB channel decoder 205 converts the channel distortion compensated signal to an MPEG transport (TP) type signal to output.

However, in the general ATSC 8VSB receiver shown in FIG. 2, in case that the E8-VSB signal corresponding to the multiplexed signal of the enhanced data and the main data is transmitted, the enhanced data packets will be recognized as null packets via PID (Packet Identification) of MPEG transport header and gracefully discarded. Therefore the legacy ATSC 8-VSB receiver will receive the main data and discard the enhanced data as null packets.

SUMMARY

Accordingly, the present invention is directed to a method of processing a digital television (DTV) signal. Herein, the DTV signal is generated by performing Reed-Solomon (RS) encoding on additional data, multiplexing the RS-encoded additional data with main data, RS encoding the multiplexed additional and main data, interleaving the RS-encoded additional and main data, trellis encoding the interleaved additional and main data, and transmitting a Radio Frequency (RF) DTV signal including the trellis-encoded additional and main data. The method to process the DTV signal includes receiving the DTV signal including the additional data multiplexed with the main data through an antenna, in which signaling information is periodically inserted in the additional data. The received DTV signal is demodulated including performing channel equalization on the demodulated DTV signal. Trellis decoding is performed on the channel-equalized DIV signal. Further, the additional data from the trellis-decoded DTV signal is extracted including removing dummy data from the extracted additional data.

An object of the present invention is to provide an enhanced 8-VSB reception system and E8-VSB data demultiplexing method, by which an enhanced VSB signal can be stably received as well as a previous ATSC 8VSB signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an E8-VSB reception system according to the present invention, which receives an E8-VSB signal transmitted from an E8-VSB transmission system which Multiplexes a first enhanced data coded at ½ code rate and a second enhanced data coded at ¼ code rate by 164-byte packet unit according to a multiplexing format of E8-VSB map information inserted in a reserved area of a field sync signal and further pre-processes the multiplexed enhanced data packets to output as 188-byte transport packet and multiplexes the pre-processed enhanced data and a normal data by 188-byte transport packet unit according to the multiplexing format of the E8-VSB map information inserted in the reserved area of the field sync signal, includes a tuner receiving an E8-VSB modulated RF signal via antenna, the tuner selecting an RF signal of a specific channel by tuning, the tuner converting the selected RF signal to an IF signal to output, a demodulator converting the IF signal outputted from the tuner to a baseband signal to output, an E8-VSB map recovery detecting the field sync signal and a field identifying signal within a frame from an output of the demodulator by performing frame sync recovery, the E8-VSB map recovery extracting to decode the E8-VSB map information inserted in the reserved area of the field sync signal using the detected field sync and identifying signals, the E8-VSB map recovery generating various kinds of E8-VSB data attribute, a channel equalizer compensating channel distortion included in the VSB-modulated signal by receiving the data modulator output and the E8-VSB data attribute of the E8-VSB map recovery, and an E8-VSB channel decoder/demultiplexer decoding a normal data, a first enhanced data, and a second enhanced data from a signal equalized in the channel equalizer using the E8-VSB map information of the E8-VSB map recovery, the E8-VSB data attributes, and the field sync signal.

The E8-VSB map information is Kerdock-coded to be inserted in the reserved area of the field sync signal and includes information of each packet number of the first and second enhanced data transmitted on one field, the multiplexing format of the first and second enhanced data, and the multiplexing format of the enhanced data and the main data.

The E8-VSB map recovery includes a frame sync recovery detecting the field sync signal and the field identifying signal indicating an even or odd field by performing frame synchronization from data symbols outputted from the demodulator, a map information extractor extracting the E8-VSB map information inserted in the field sync signal from the data symbols outputted from the demodulator using the field sync signal, a Kerdock decoder decoding the extracted map information by Kerdock decoding algorithm, a current map decider deciding the E8-VSB map information of a current field from the Kerdock-decoded E8-VSB map information by the field sync signal and the field identifying signal, and an E8-VSB data attribute generator generating the E8-VSB data attributes indicating attributes of a symbol or a byte unit of the E8-VSB data by the E8-VSB map information of the current field and the field sync signal.

The E8-VSB data attribute generator includes a main and enhanced mux packet processor generating to output a 188-byte attribute packet including attribute information of an E8-VSB data of byte unit by receiving the E8-VSB map information of the current field outputted from the current map decider and the field sync signal outputted from the frame sync recovery, an ATSC RS coder outputting a 207-byte attribute packet by discarding the first byte of an input packet corresponding to 0x47 MPEG sync byte and adding 20 bytes having an attribute of a normal data to the 188-byte attribute packet, an ATSC data interleaver performing ATSC data byte interleaving on the 207-byte attribute packet to output by byte unit, and a byte-symbol converter converting the interleaved data of the byte unit to a symbol unit to output as the E8-VSB symbol attribute.

The main and enhanced mux packet processor includes an enhanced packet generator generating an attribute packet of 164-byte unit having the attribute information only indicating the first or second enhanced data according to distribution formations and rates of first and second enhanced data packets of the current field within the E8-VSB map information of the current field, a null enhanced RS coder expanding 20 bytes by copying the attribute of each of the packets to an enhanced data attribute packet having the attribute information of the enhanced data outputted from the enhanced packet generator, an enhanced data interleaver performing enhanced data interleaving on data outputted from the null enhanced RS coder, a null-bit expander inserting a null bit in an interleaved byte outputted from the enhanced data interleaver to fit the first and second enhanced data to expand, a null MPEG header inserter inserting a byte of a normal data attribute corresponding to an MPEG header of 4 bytes in front of each 184 bytes outputted from the null bit expander, and a main and enhanced packet multiplexer multiplexing to output a normal data packet and an enhanced data packet outputted from the null MPEG header inserter by 188-byte packet unit using the map information of the current field and the field sync signal.

The main and enhanced packet generator seeks a number (H) of first enhanced data of 164-byte packet unit and a number (Q) of second enhanced data of 164-byte packet unit from E8-VSB map information based on the field sync signal outputted from E8-VSB map recovery to find a number (2P) of packets of 188-byte unit allocated to enhanced data in one VSB field (2P=2H+4Q), and the main and enhanced packet multiplexer distributes to multiplex normal data packets and enhanced data packets by a distribution method selection included in the E8-VSB map information.

The E8-VSB channel decoder/demultiplexer includes a main data decoder performing Viterbi decoding, 12-way deinterleaving, ATSC data byte deinterleaving, ATSC RS decoding, and ATSC data derandomizing on the equalized data output according to the E8-VSB data attribute, and an enhanced data decoder decoding to separate the first and second enhanced data by sequentially performing ATSC parity removal, ATSC data derandomizing, null bit removal, enhanced data deinterleaving, enhanced RS decoding, and enhanced packet demultiplexing on the ATSC data deinterleaved E8-VSB data outputted from the main data decoder by packet unit.

And, the enhanced data decoder includes an ATSC parity remover removing an ATSC RS parity portion from the ATSC byte deinterleaved packet data outputted from the main data decoder, an ATSC data derandomizer performing the ATSC data derandomizing on the ATSC RS parity portion removed data, a main and enhanced mux packet processor generating to output an attribute packet including attribute information of an E8-VSB data of byte unit by receiving the E8-VSB map information of a current field and the field sync signal, a null bit remover removing, entire bits of the normal data byte and insignificant bits of the first and second enhanced data bytes to reconfigure the data of the byte unit into a first significant enhanced byte and a second significant enhanced byte by using E8-VSB byte attribute outputted from the main and enhanced mux packet processor, an enhanced data deinterleaver performing the enhanced data deinterleaving on enhanced data of the byte unit configured with significant bits outputted from the null bit remover, an enhanced RS decoder performing the enhanced RS decoding on the enhanced deinterleaved data, and an enhanced packet demultiplexer separating the enhanced RS decoded data into a first enhanced data packet and a second enhanced data packet to output using the E8-VSB map information and the field sync signal outputted from the E8-VSB map recovery.

In another aspect of the present invention, an E8-VSB data demultiplexing method of an E8-VSB reception system which receives an E8-VSB signal transmitted from an E8-VSB transmission system, the E8-VSB transmission system which multiplexes a first enhanced data coded at ½ code rate and a second enhanced data coded at ¼ code rate by 164-byte packet unit according to a multiplexing format of E8-VSB map information inserted in a reserved area of a field sync signal and further pre-processes the multiplexed enhanced data packets to output as 188-byte transport packet and multiplexes the pre-processed enhanced data and a normal data by 188-byte transport packet unit according to the multiplexing format of the E8-VSB map information inserted in the reserved area of the field sync signal. The E8-VSB data demultiplexing method of the E8-VSB reception system includes a step (a) of detecting the field sync signal and a field identifying signal indicating an even or odd field within a frame from received and demodulated E8-VSB data by performing frame sync recovery, a step (b) of extracting to decode the E8-VSB map information inserted in the reserved area of the field sync signal using the detected field sync and identifying signals detected in the step (a) and generating various kinds of E8-VSB data attributes, a step (c) of compensating channel distortion included in the VSB-modulated signal by receiving the various kinds of the E8-VSB data attributes, and a step (d) of receiving the E8-VSB data attributes synchronized with an E8-VSB symbol equalized data in the step (c) and decoding a normal data, a first enhanced data, and a second enhanced data from the equalized signal using the E8-VSB map information of the E8-VSB map recovery, the E8-VSB data attributes, and the field sync signal.

The step (b) includes a step (b-1) of extracting the E8-VSB map information inserted in the field sync signal from the data symbols outputted from the demodulator using the field sync signal, a step (b-2) of decoding the extracted map information by Kerdock decoding algorithm, a step (b-3) of deciding the E8-VSB map information of a current field from the Kerdock-decoded E8-VSB map information by the field sync signal and the field identifying signal, and a step (b-4) of generating the E8-VSB data attributes by the E8-VSB map information of the current field and the field sync signal.

The step (b-4) includes the steps of generating to output a 188-byte attribute packet including attribute information of an E8-VSB data by receiving the E8-VSB map in formation of the current field outputted from the current map decider and the field sync signal outputted from the (b-3) step, outputting a 207-byte attribute packet by discarding the first byte of an input packet corresponding to 0x47 MPEG sync byte and adding 20 bytes having an attribute of a normal data to the 188-byte attribute packet, performing ATSC data byte interleaving on the 207-byte attribute packet to output by byte unit, and converting the interleaved data of the byte unit to a symbol unit to output as the E8-VSB data symbol attribute.

The attribute packet generating step includes the steps of generating an enhanced data attribute packet of 164-byte unit having the attribute information only indicating the first or second enhanced data according to distribution formations and rates of first and second enhanced data packets of the current field within the E8-VSB map information of the current field, expanding 20 byte by copying the attribute of each of the packets to the enhanced data attribute packet having the attribute information of the enhanced data only, performing enhanced data interleaving on parity-expanded data outputted from the expanding step, expanding an interleaved byte outputted from the enhanced data interleaving step by inserting a null bit in the interleaved byte to fit the first and second enhanced data, inserting a 4-byte MPEG header value indicating a normal data byte in each 184 bytes outputted from the null bit expanding step, and multiplexing to output a normal data packet and an enhanced data packet having the null MPEG header inserted by 188-byte packet unit using the map information of the current field and the field sync signal.

And, the step (d) includes a step (d-1) of main data decoding by sequentially performing Viterbi decoding, 12-way deinterleaving. ATSC data byte deinterleaving, ATSC RS decoding, and ATSC data derandomizing on the equalized E8-VSB symbol according to the E8-VSB data attributes, and a step (d-2) of decoding to separate the first and second enhanced data by sequentially performing ATSC parity removal, ATSC data derandomizing, null bit removal, enhanced data interleaving, enhanced RS decoding, and enhanced packet demultiplexing on the ATSC data deinterleaved E8-VSB data outputted by packet unit in the step (d-1).

In the enhanced packet demultiplexer, a number (H) of first enhanced data packets of 164-byte unit and a number (Q) of second enhanced data packets of 164-byte unit are sought from the E8-VSB map outputted from the E8-VSB map recovery block.

In the null bit remover of the enhanced data decoder, the normal data packets, the MPEG headers added to the enhanced data packets and the null bits inserted for byte expansion at the transmitter are removed using the E8-VSB map, the E8-VSB data attributes and field sync signal outputted from the E8-VSB map recovery.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 is a detailed block diagram of an E8-VSB channel decoder/demultiplexer in FIG. 8;

FIG. 16A is a diagram of a multiplexing format of normal data packets and enhanced data packets, in which an exemplary distribution having a pattern according to conditions is shown; and FIG. 16B is a diagram of a multiplexing format of normal data packets and enhanced data packets, in which an exemplary uniform distribution is shown.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

For the understanding of an E8-VSB reception system of the present invention, the E8-VSB transmission system and multiplexing process disclosed in the Korean Patent Application No. 10-2003-0017834 is explained with reference to the attached drawings as follows.

First of all, in the Korean Patent Application No. 10-2003-0017834, the recent MPEG-4 video or various supplementary data (e.g., program execution file, stock information, etc.) can be transferred via enhanced data as well as the previous MPEG-2 video and Dolby sound data. In doing so, error correction encoding is additionally performed on the enhanced data except main data. And, ½ enhanced data and ¼ enhanced data mean data on which encoding is additionally performed at ½ and ¼ code rates, respectively, unlike the main data. Hence, the enhanced data is provided with reception performance superior to that of the main data in noise generated from channel and interference due to multi-path. Specifically, the ¼ enhanced data coded at ¼ code rate has performance more excellent than that of the ½ enhanced data coded at ½ code rate.

Figure 3:
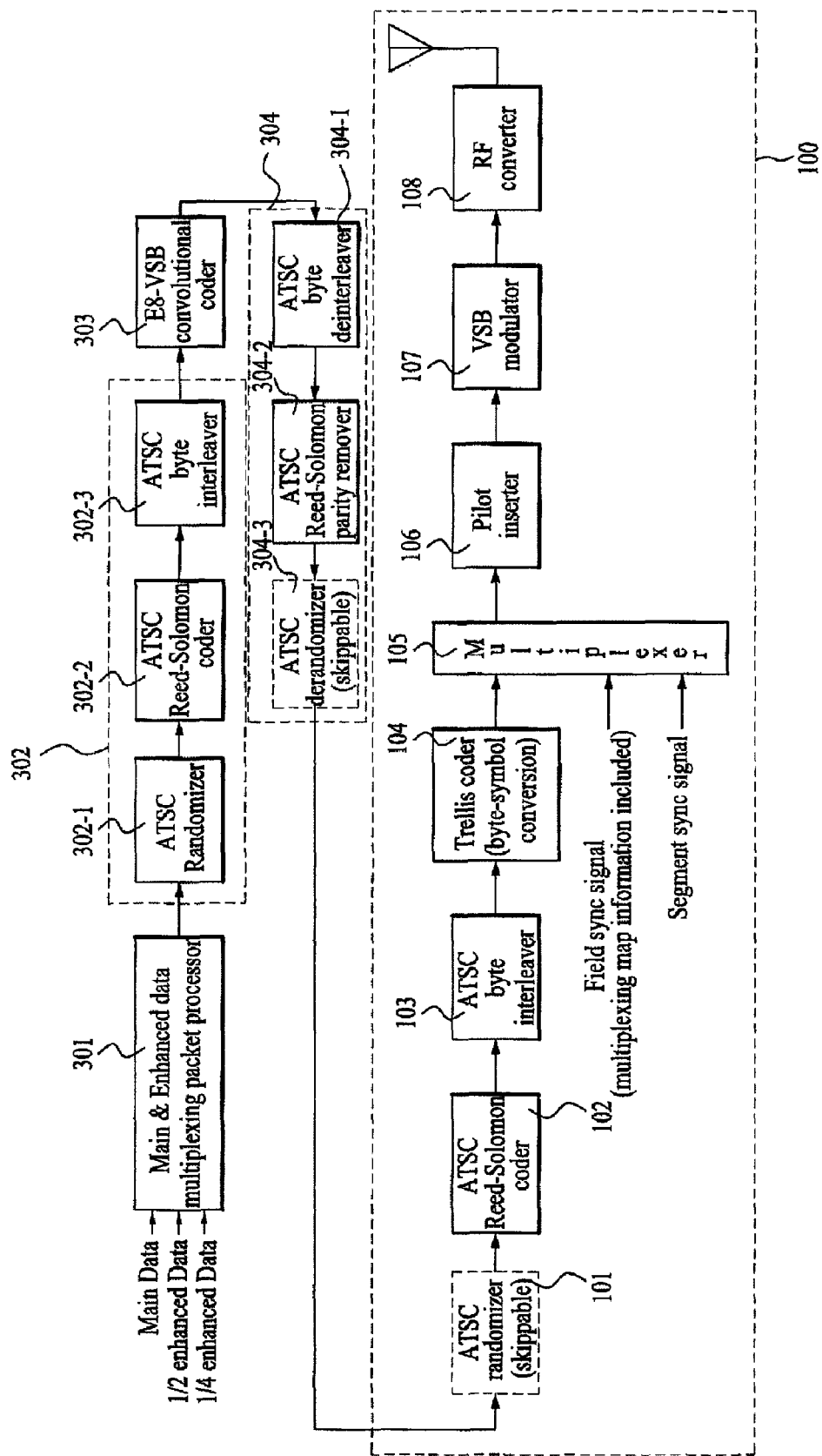
FIG. 3 is a block diagram of an E8-VSB transmission system according to the present invention.

Referring to FIG. 3, a main and enhanced mux packet processor 301 multiplexes ½ enhanced data and ¼ enhanced data by 164-byte packet unit and further pre-processes the multiplexed enhanced data to output as a 188-byte transport packet format and multiplexes the pre-processed enhanced data and main data by 188-byte packet unit again, and then outputs the data to a first encoding unit 302. The first encoding unit 302 includes a randomizer 302-1, Reed-Solomon coder 302-2, and byte interleaver 302-3 sequentially connected to an output end of the main and enhanced mux packet processor 301. The first encoding unit 302 sequentially performs data randomization, Reed-Solomon coding, and data interleaving on a data packet outputted from the main and enhanced mux packet processor 301 to output to an E8-VSB convolutional coder 303. The E8-VSB convolutional coder 303 converts the interleaved data of byte unit outputted from the first encoding unit 302 to symbols, performs convolutional coding on an enhanced data symbol only, converts the symbol to data of byte unit, and then outputs the converted data to a first decoding unit 304.

The first decoding unit 304 includes a byte deinterleaver 304-1, Reed-Solomon parity remover 304-2, and derandomizer 304-3 sequentially connected to an output end of the E8-VSB convolutional coder 303. The first decoding unit 304 sequentially performs data deinterleaving, Reed-Solomon parity removal, and derandomization on the data of byte unit outputted from the E8-VSB convolutional coder 303 to output to an 8VSB transmission unit 100.

Figure 1:
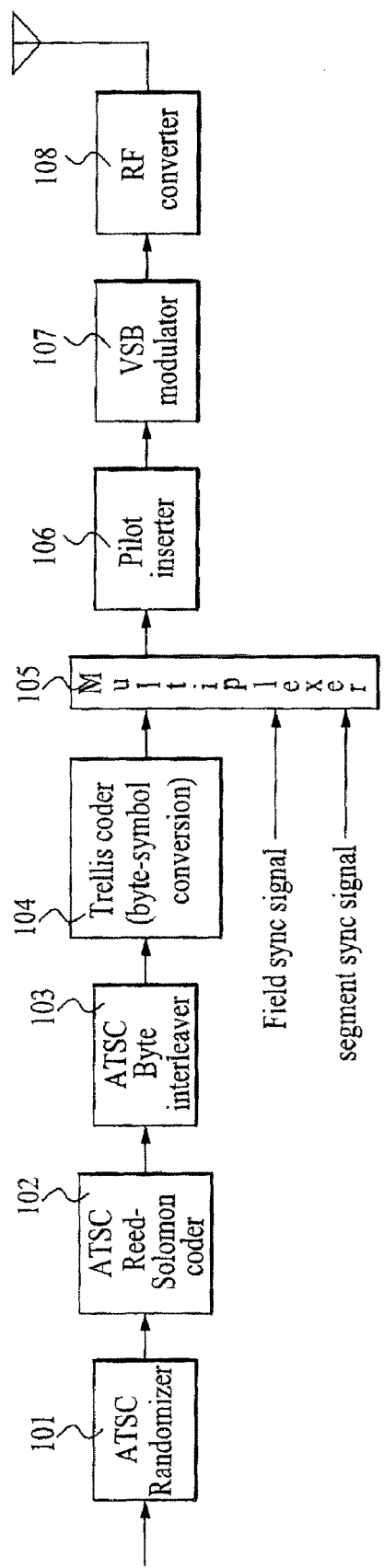
FIG. 1 is a block diagram of an ATSC 8VSB transmission system according to a related art.

The 8VSB transmission unit 100 having the same configuration shown in FIG. 1 sequentially performs data randomization. Reed-Solomon coding, data interleaving, trellis coding, and the like again on the data of which Reed-Solomon parity was removed by the first decoding unit 304. In the FIG. 3, ATSC derandomizer 304-3 of the first decoding unit 304 and ATSC randomizer 101 of the 8VSB transmission unit 100 can be skipped together.

Figure 4:
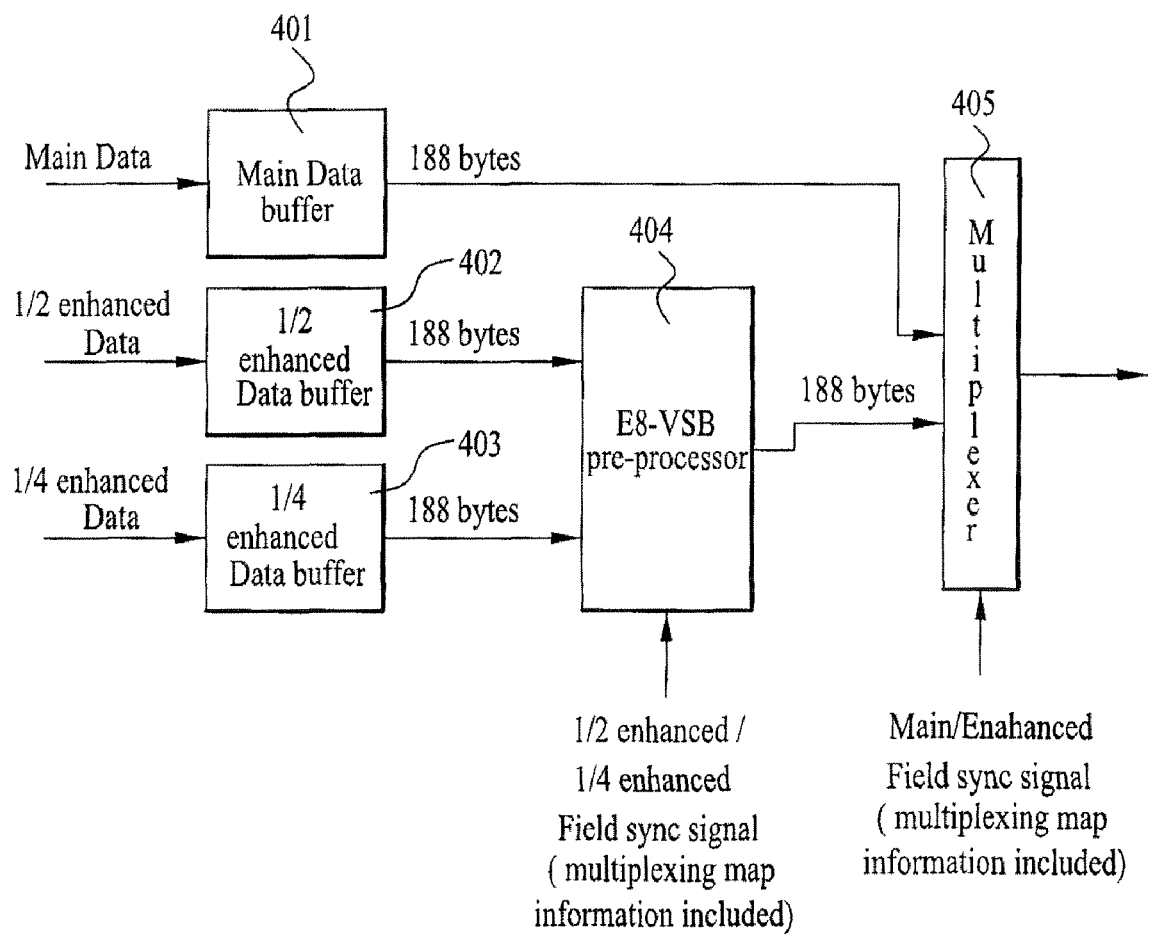
FIG. 4 is a detailed block diagram of a main and enhanced mux packet processor of the system in FIG. 3.

FIG. 4 is a detailed block diagram of the main and enhanced mux packet processor 301. After ½ enhanced data and ¼ enhanced data have been multiplexed by 164-byte packet unit and further preprocessed by the E8-VSB preprocessor, main data is multiplexed with the pre-processed enhanced data by 188-byte packet unit. In doing so, a frame configuring one picture in the VSB transmission system includes two data fields. Each of the data fields includes one field sync segment and 312 data segments. And, one data segment includes a data segment sync signal of 4-symbols and data of 828-symbols.

Referring to FIG. 4, a main data buffer 401 temporarily stores main data inputted as a packet of 188-byte unit and then outputs the main data to a main and enhanced packet multiplexer 405. A ½ enhanced data buffer 402 temporarily stores ½ enhanced data inputted as a packet of 188-byte unit. A ¼ enhanced data buffer 403 temporarily stores ¼ enhanced data inputted as a packet of 188-byte unit and then outputs the data to an E8-VSB pre-processor 404.

The E8-VSB pre-processor 404 multiplexes the ½ enhanced data outputted from the ½ enhanced data buffer 402 and the ¼ enhanced data outputted from the ¼ enhanced data buffer 403 with each other by 164-byte packet unit according to a previously determined format, further pre-processes to the same structure of an MPEG transport packet of the main data, and then outputs the converted data to the main and enhanced packet multiplexer 405.

The main and enhanced packet multiplexer 405 multiplexes the main data packet outputted from the main data buffer 401 and the enhanced data packet outputted from the E8-VSB pre-processor 404 into 188-byte packet units according to main/enhanced data multiplexing information inserted in the field sync signal.

In doing so, once the number of packets of the enhanced data to be transmitted on one VSB data field is determined, the E8-VSB transmission system inserts main/enhanced data multiplexing map information (hereinafter referred to as E8-VSB map information) associated with the multiplexing format and the transport packet number of the enhanced data in an unused area within the field sync segment and then transmits the corresponding signal. Hence, the E8-VSB reception system enables to perform accurate demultiplexing to correspond to the field sync.

Figure 5A:
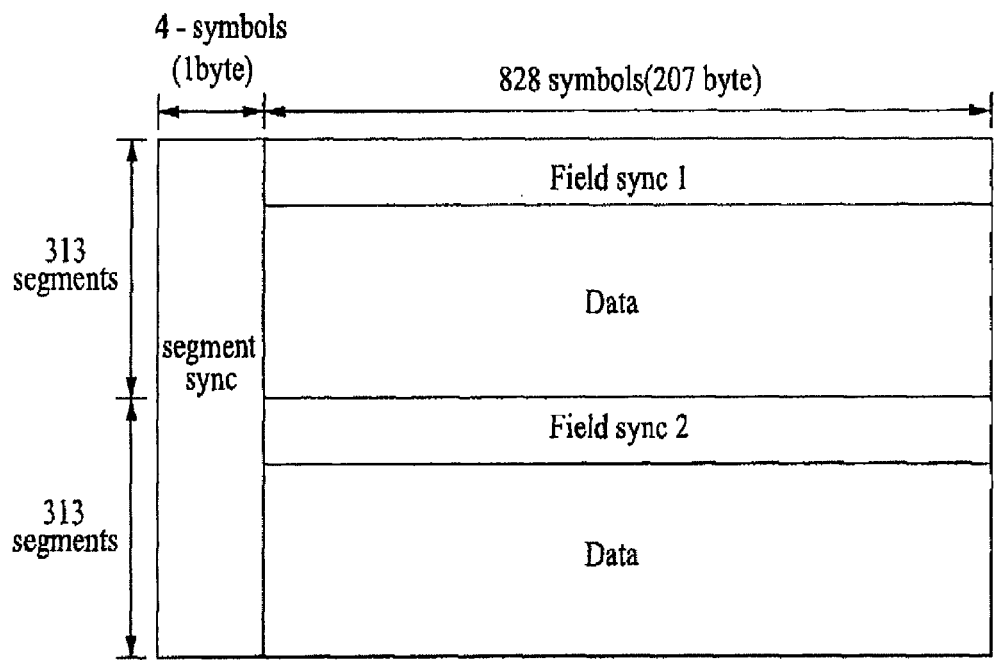
FIG. 5A is a structural diagram of a data frame of ATSC 8VSB transmission system.

FIG. 5A is a structural diagram of a data frame of an ATS 8VSB transmission system.

Referring to FIG. 5, one frame is divided into an odd field and an even field. Each of the fields is divided into three hundred thirteen segments. The 313 segments include one field sync segment containing a training sequence signal and three hundred twelve data segments.

And, one segment includes 832-symbols. In this case, first 4-symbols in one segment construct a sync part and a first segment in each field becomes a field sync part.

Figure 5B:
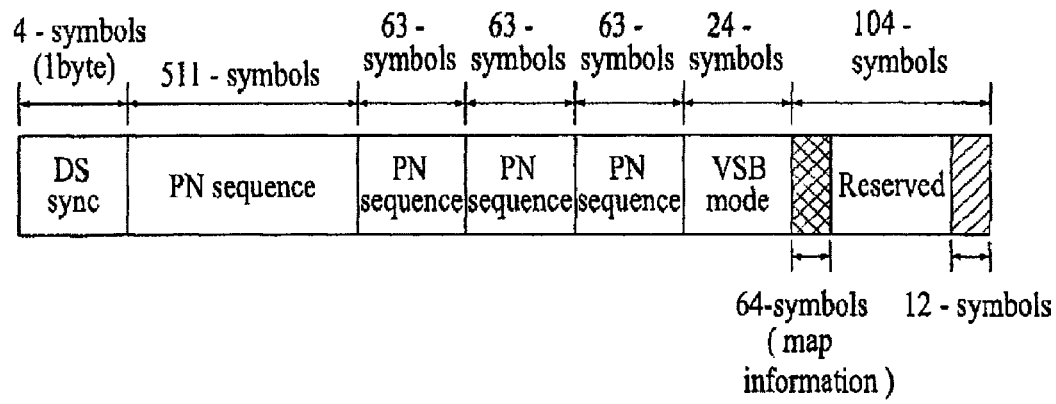
FIG. 5B is a structural diagram of a field sync signal in FIG. 5A.

The field sync segment format is shown in FIG. 5B. A segment sync pattern exists in first 4-symbols, pseudo random sequences PN 511, PN 63, PN 63, and PN 63 follow the segment sync pattern, and VSB mode associated information exists in the next 24-symbols, in turn. In this case, a polarity of the second PN 63 among the three PN 63 sections is alternately changed. Namely, '1' is changed into '0' or '0' is changed into '1'. Hence, one frame can be divided into even and odd fields according to the polarity of the second PN 63.

Meanwhile, the rest 104-symbols following the 24-symbols where the VSB mode associated information exists are reserved. And, the last 12-symbols data of the previous segment are copied to last 12-symbols of the reserved area.

In the present invention, E8-VSB map information including the multiplexing format and the main/enhanced data multiplexing information associated with the transport packet number of the enhanced data is inserted in the first 64-symbols of the reserved area within the field sync segment in FIG. 5B to be transmitted.

Namely, 64 two-level symbols of the reserved area within the field sync segment are used for transmitting E8-VSB map information. The E8-VSB map information is inserted by being coded as Kerdock(64,12). A polarity of the Kerdock code word becomes reversed in an even (negative PN 63) data field. The Kerdock coding algorithm is known to public, of which detailed explanation will be skipped in the following.

Figure 6:
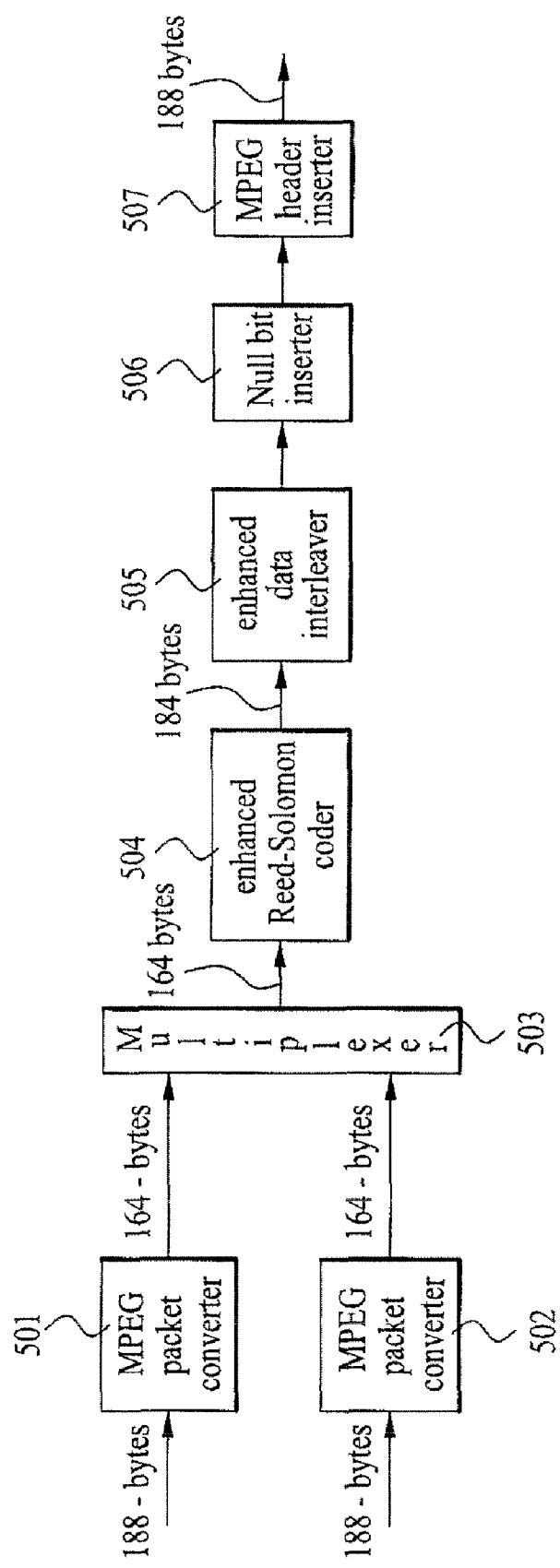
FIG. 6 is a detailed block diagram of an E8-VSB pre-processor in FIG. 4.

FIG. 6 is a detailed block diagram of the E8-VSB pre-processor 404.

Referring to FIG. 6, a ½ MPEG packet converter 501 segments ½ enhanced data inputted as packets of 188-byte unit into 164-byte units without data alteration to output to an enhanced packet multiplexer 503. And, a ¼ MPEG packet converter 502 segments ¼ enhanced data inputted as packets of 188-byte unit into 164-byte units without data alteration to output to the enhanced packet multiplexer 503.

The enhanced packet multiplexer 503 multiplexes the ½ and ¼ enhanced data outputted from the ½ and ¼ MPEG packet converters 501 and 502 by 164-byte packet unit according to E8-VSB map information within a field sync segment to output to an enhanced Reed-Solomon coder 504. The enhanced Reed-Solomon coder 504 performs Red-Solomon coding on the enhanced data multiplexed in the enhanced packet multiplexer 503 and then adds a parity code of 20 bytes thereto, thereby converting the enhanced data of 164-byte unit to a packet of 184-byte unit to output to an enhanced data interleaver 505. In order to enhance performance against burst noise, the enhanced data interleaver 505 changes a sequence of the data outputted from the enhanced Reed-Solomon coder 504 and then outputs the sequence-changed data to a null-bit inserter 506. Subsequently, the null-bit inserter 506 inserts a null-bit corresponding to the ½ or ¼ enhanced data outputted from the enhanced data interleaver 505 to expand a packet and then outputs the expanded packet to an MPEG header inserter 507. The MPEG header inserter 507 inserts an MPEG header of 4 bytes in a front portion of each 184 bytes of the enhanced data having the null-bit inserted by the null-bit inserter 506 to make a format identical to that of the MPEG transport packet of the main data and then outputs the corresponding data to the main and enhanced packet multiplexer 405. This is to discard the packet by checking PID in case that the previous VSB receiver receives the enhanced data packet When the ½ enhanced data of 1 byte is inputted, the null-bit inserter 506 inserts a null-bit between the respective bits to expand to 2 bytes. When the ¼ enhanced data of 1 byte is inputted, the null-bit inserter 506 repeats each bit twice and inserts null-bits between the respective bits to expand to 4 bytes. Such a null-bit will be replaced by a parity bit by an E8-VSB convolutional coder 303.

Moreover, the multiplexing information for multiplexing the ½ and ¼ enhanced data in the enhanced packet multiplexer 503 of the E8-VSB pre-processor 404 and the multiplexing information for multiplexing the main data and the enhanced data in the main and enhanced packet multiplexer 405 of the main and enhanced mux packet processor 301 is called the E8-VSB map information in the present invention. As mentioned in the foregoing description, the E8-VSB map information is Kerdock-coded and then inserted in the reserved are (bit) within the field sync segment to be transmitted.

Meanwhile, a method of multiplexing the ½ and ¼ enhanced data in the enhanced packet multiplexer 503 of the E8-VSB pre-processor 404 is explained in detail as follows.

First of all, the numbers of 12 and ¼ enhanced data packets of 164-byte unit multiplexed in the enhanced packet multiplexer 503 within one VSB data field will be defined as H and Q, respectively.

In this case, the null-bit inserter 506 of FIG. 6 inserts a null-bit to output 2 bytes in case of receiving the ½ enhanced data of 1 byte or inserts null-bits to output 4 bytes in case of receiving the ¼ enhanced data of 1 byte. Since one VSB data field consists of three hundred twelve data segments, a maximum value of 'H' becomes 156 (=312/2) if the ½ enhanced data is multiplexed only to be transmitted. By the same rule, a maximum value of 'Q' becomes 78 (=312/4) in case of transmitting the ¼ enhanced data only. Namely, if the ½ enhanced data is transmitted only, it is able to transmit maximum 156-packets (1-packet=164 bytes). And, if the ¼ enhanced data is transmitted only, it is able to transmit maximum 78-packets (1-packet=164 bytes).

This can be generalized by the following equation.

$$N+2H+4Q=312$$

In this case, the number of data segments within one VSB field is 312 resulting from adding the normal data packet number (N), the packet number (H) of a first enhanced data, and the packet number (Q) of a second enhanced data to each other according to the above expression.

The Korean Patent Application No. 10-2003-0017834 has proposed methods of multiplexing ½ and ¼ enhanced data packets in the enhanced packet multiplexer 503 if the values of 'H' and 'Q' are determined.

Figure 7A:
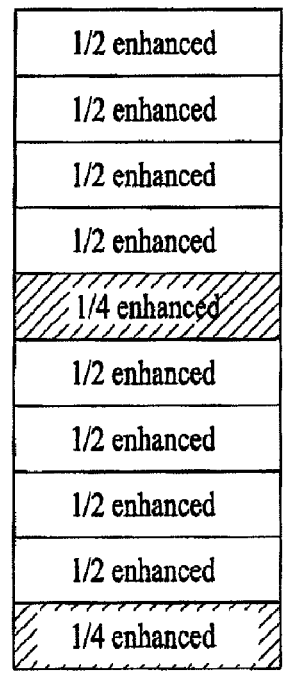
FIG. 7A is a diagram of multiplexing ½ enhanced data packets and ¼ enhanced data packets by a uniform distribution.

The first method of uniform multiplexing, as shown in FIG. 7A, is to multiplex the ½ and ¼ enhanced data packets with equal interval.

Figure 7B:
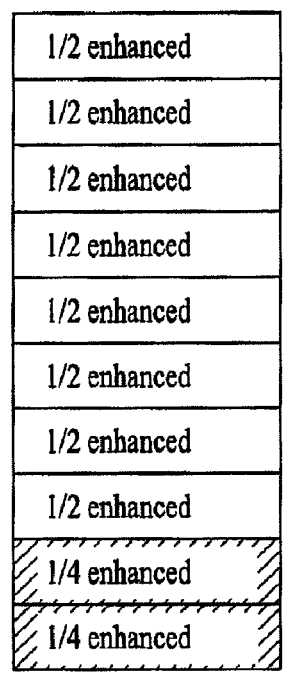
FIG. 7B is a diagram of multiplexing ½ enhanced data packets and ¼ enhanced data packets by a grouping distribution.

The second method of grouping multiplexing, as shown in FIG. 7B, is to multiplex the ½ and ¼ enhanced data packets by grouping the ½ enhanced data packets and the ¼ enhanced data packets separately. The ½ enhanced data packets, as shown in FIG. 7B, are grouped for one data field to be outputted and the ¼ enhanced data packets are then grouped for one data field to be outputted.

Figure 7C:
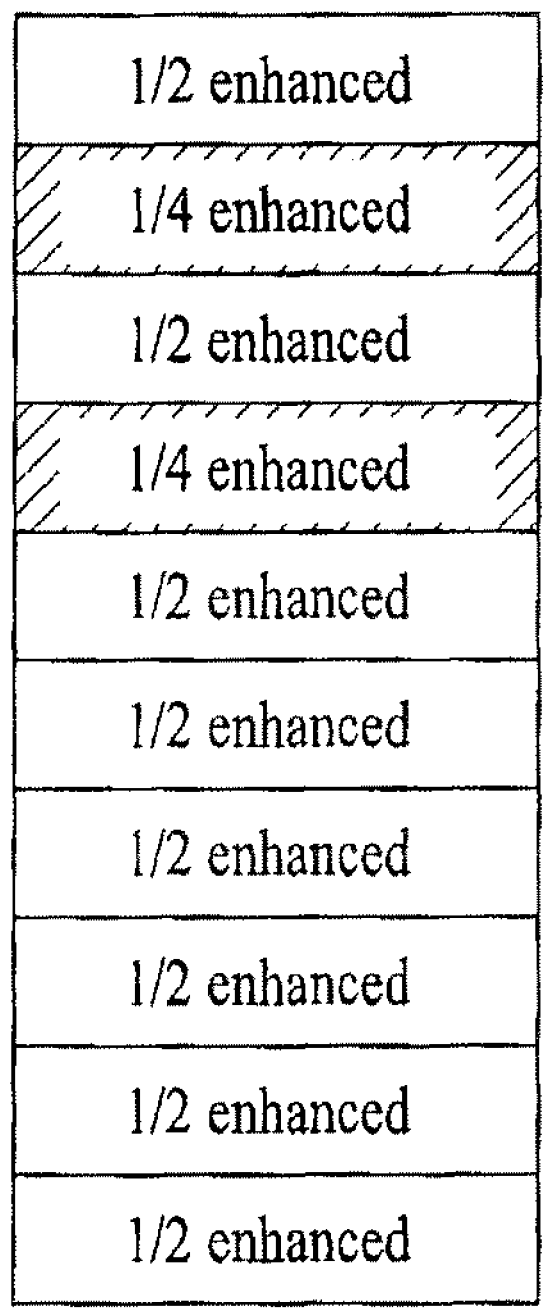
FIG. 7C is a diagram of multiplexing ½ enhanced data packets and ¼ enhanced data packets by an alternative distribution.

And, the third method of alternate multiplexing, as shown in FIG. 7C, is to multiplex the ½ and ¼ enhanced data packets alternately. First of all, the ½ and ¼ enhanced data packets, as shown in FIG. 7C, are alternately multiplexed. Once either the ½ or ¼ enhanced data packets are completely multiplexed, the rest data packets are multiplexed.

Namely, FIGS. 7A to 7C show the methods of multiplexing the ½ and ¼ enhanced data packets that will be transmitted on one VSB data field in case of H=8 and Q=2.

If the numbers H and Q of the ½ and ¼ enhanced data packets transmitted on one VSB data field are determined, the ½ enhanced data packet number, ¼ enhanced data packet number, and E8-VSB map information associated with the format used for the multiplexing among the above-explained multiplexing methods are inserted in the reserved area within the field sync segment to transmit to the E8-VSB reception system and outputted to the enhanced packet multiplexer 503 and the main and enhanced packet multiplexer 405. The enhanced packet multiplexer 503 then multiplexes the ½ and ¼ enhanced data packets by the multiplexing format according to the enhanced data multiplexing information. In doing so, the format used for the multiplexing may be fixed to one of the multiplexing methods (formats) or can be adaptively decided according to the numbers of the ½ and ¼ enhanced data packets multiplexed on one VSB data field.

In case that the E8-VSB transmission system according to the present invention adopts to use one of the three methods only, the values of 'H' and 'Q' need to exist in the E8-VSB map information within the field sync signal only. Yet, in case that all of the three methods are optionally used or in case that two of the three methods are optionally used, the information indicating which method is used for the corresponding multiplexing should be added to the E8-VSB map information within the field sync signal.

Namely, the information for the transport packet numbers of the ½ and ¼ enhanced data within one data field, the information indicating which format is adopted to multiplex the ½ and ¼ enhanced data, and the information indicating which format is used for multiplexing the enhanced data and the main data should be contained in the E8-VSB map information inserted in the reserved area within the field sync segment.

Figure 8:
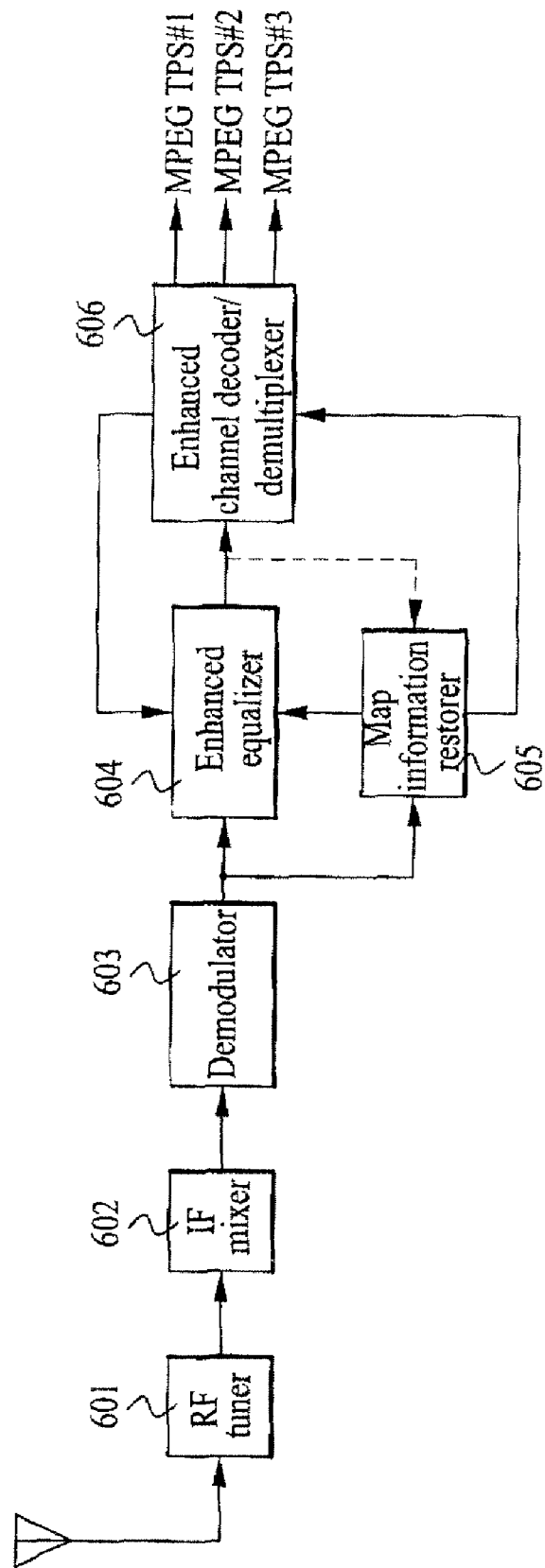
FIG. 8 is a block diagram of an E8-VSB reception system according to the present invention.

FIG. 8 is a block diagram of an E8-VSB reception system according to the present invention for receiving an E8-VSB signal transmitted from the E8-VSB transmission system in FIGS. 3 to 7.

Figure 2:
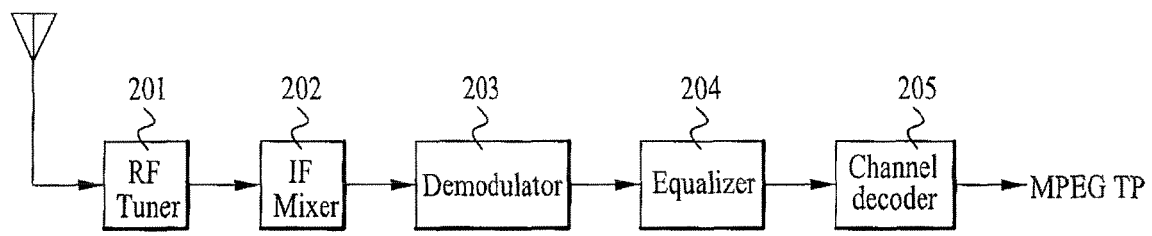
FIG. 2 is a block diagram of a general ATSC 8VSB receiver.

Referring to FIG. 8, an E8-VSB reception system according to the present invention includes a tuner 601, an IF mixer 602, a demodulator 603, an equalizer 604, an E8-VSB map recovery 605, and an E8-VSB channel decoder/demultiplexer 606. Configurations and operations of the tuner 601, IF mixer 602, and demodulator 603 are equivalent to those in FIG. 2.

Namely, once an E8-VSB-modulated RF signal is received via antenna, the tuner 601 selects an RF signal of a specific channel only by tuning and then converts it to an IF signal to output to the IF mixer 602. The IF mixer 602 down-covers the IF signal outputted from the tuner 601 to a near baseband (BB) signal to output to the demodulator 603. The demodulator 603 performs VSB demodulation on the near BB signal to output to the equalizer 604 and the F8-VSB map recovery 605. The E8-VSB map recovery 605 detects E8-VSB map information inserted in a reserved area of a field sync segment to output to the equalizer 604 and the E8-VSB channel decoder/demultiplexer 606. The equalizer 604 receives the decision feedback from the E8-VSB channel decoder/demultiplexer 606 at its end and the output of the E8-VSB map recovery 605 and then compensates channel distortion included in the VSB-demodulated signal to output to the E8-VSB channel decoder/demultiplxer 606. Namely, the equalizer 604 performs enhanced equalization using the output of the E8-VSB map recovery 605 and more reliable symbol decisions from the E8-VSB channel decoder/demultiplexer 606.

Figure 9:
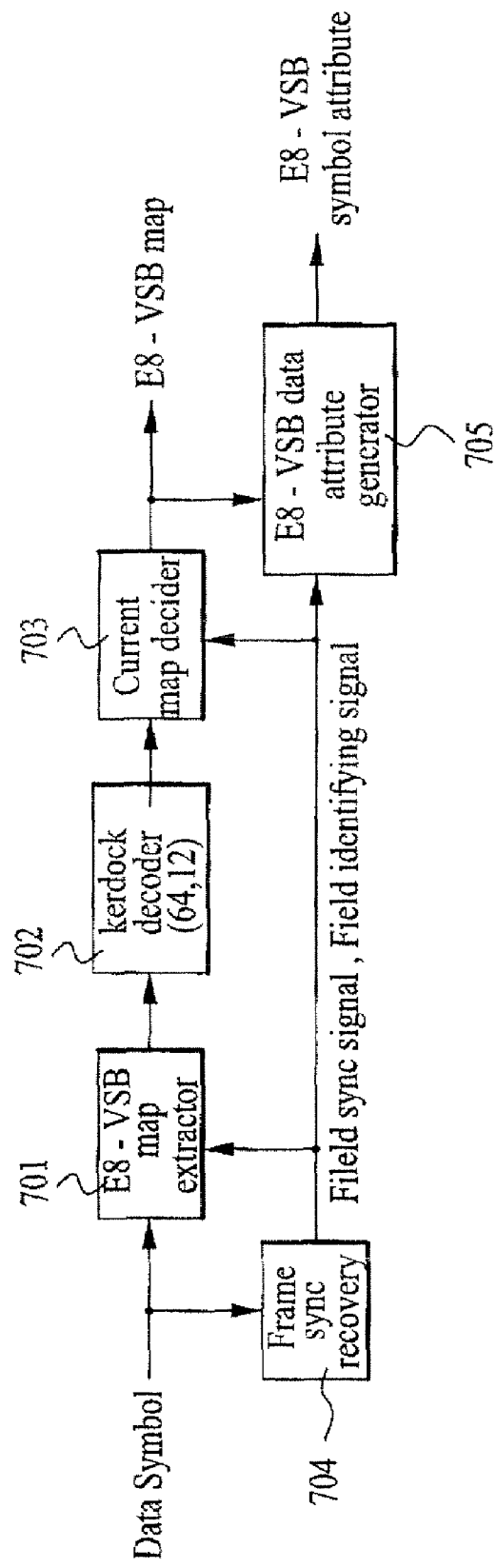
FIG. 9 is a detailed block diagram of an E8-VSB map recovery unit in FIG. 8.

FIG. 9 is a detailed block diagram of the E8-VSB map recovery 605.

Referring to FIG. 9, the E8-VSB map recovery 605 includes an E8-VSB map extractor 701 extracting E8-VSB map information from data symbols outputted from the demodulator 603 or data symbols outputted from the enhanced equalizer 604, a Kerdock decoder 702 decoding the extracted E8-VSB map information by Kerdock decoding algorithm, a frame sync recovery 704 performing frame synchronization from the data symbols outputted from the demodulator 603 or the data symbols outputted from the enhanced equalizer 604 to output a field sync signal and a field identifying signal indicating an even or odd field, a current map deciding unit 703 deciding a current map by receiving the E8-VSB map information decoded in the Kerdock decoder 702 the field sync signal, and the field identifying signal, and an E8-VSB data attribute generator 705 generating attribute information of a current E8-VSB data according to the current map information and the field sync signal.

The E8-VSB map recovery 605 performs an operation of extracting the E8-VSB map information inserted in a field sync section by the E8-VSB transmission system. The E8-VSB data attribute generator 705 of the E8-VSB map recovery 605 generates information indicating attributes of the respective E8-VSB data to provide to the equalizer 604 and the E8-VSB channel decoder/demultiplexer 606, thereby intending to enhance performance of both of the equalizer 604 and the E8-VSB channel decoder/demultiplexer 606.

In order to receive the E8-VSB signal, the E8-VSB map recovery 605 is essential to the above-configured present invention. For reliable detection of the E8-VSB map, E8-VSB map recovery 605 selectively receives its input data between the input of the equalizer 604 and the output signal of the equalizer 604.

Meanwhile, explained in the following is an example that the E8-VSB map recovery 605 utilizes the input/output signal of the equalizer.

The first method enables to selectively use the input or output signal of the equalizer 604 as the input data of the E8-VSB map recovery 605 with reference to a presence or non-presence of operation of the equalizer 604 and an output SNR at the rear end of the equalizer. The second method enables to elicit the E8-VSB map information of a currently received signal by providing a pair of E8-VSB map recovery units to utilize reliability of outputs from a pair of the E8-VSB map recovery units. And, the third method synchronizes signals of the input and output sides of the equalizer 604 to use as the input data of the E8-VSB map recovery 605.

In doing so, a frame of the VSB signal should be synchronized so that the E8-VSB map recovery 605 can recognize the presence of the enhanced mode from the received signal. Hence, the frame sync recovery 704 detects the field sync signal and the field identifying signal indicating whether the current field is the even or odd field by performing frame synchronization from the inputted data symbols and then outputs them to the E8-VSB map extractor 701, the current map deciding unit 703, and the E8-VSB data attribute generator 705. Namely, it is able to detect whether the current field is the even or odd field using the polarity of the second PN 63 in the training signal of the field sync signal section.

The E8-VSB map extractor 701 receives the field sync signal from the frame sync recovery 704. If the inputted data symbol indicates the field sync signal, the E8-VSB map extractor 701 extracts the E8-VSB map information included in the field sync signal section and then outputs the extracted information to the Kerdock decoder 702.

In doing so, since the extracted E8-VSB map information was transmitted from the E8-VSB transmission system by being coded according to the Kerdock coding algorithm clearly stated in the E8-VSB specification, the Kerdock decoder 702 decodes the extracted E8-VSB map information according to the Kerdock decoding algorithm to output to the current map deciding unit 703. The current map deciding unit 703 divides the Kerdock-decoded E8-VSB map information into the even field E8-VSB map information and the odd field E8-VSB map information by the field sync signal and field identifying signal outputted from the frame sync recovery 704 and then decides the E8-VSB map information of the current field again. Hence, the decided E8-VSB map information of the current field is simultaneously outputted to the E8-VSB channel decoder/demultiplexer 606 and the E8-VSB data attribute generator 705.

The E8-VSB data attribute generator 705 generates signals indicating an attribute of E8-VSB data at the symbol, byte and packet level based on the E8-VSB map information of the Current field. Namely, the E8-VSB data attribute generator 705 generates signals indicating whether the symbol, byte or packet is a normal data (or main data) or an enhanced data. In case of the enhanced data, the E8-VSB data attribute generator 705 generates attribute information of the enhanced data for indicating whether the enhanced data is ½ enhanced data or ¼ enhanced data and then output the generated information to the equalizer 604 and the E8-VSB channel decoder/demultiplexer 606.

Figure 10:
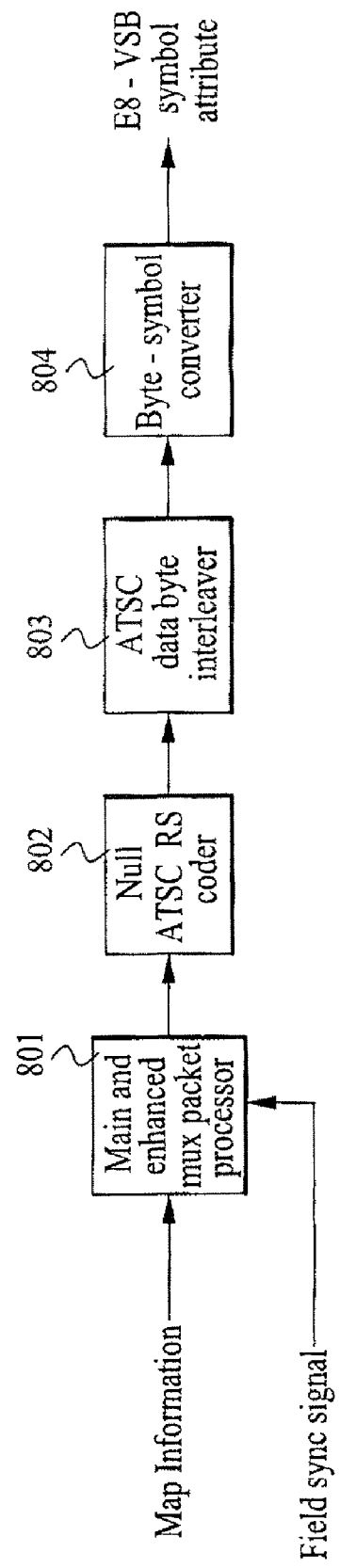
FIG. 10 is a detailed block diagram of an E8-VSB data attribute generator in FIG. 9.

FIG. 10 is a detailed block diagram of the F8-VSB data attribute generator 705.

Referring to FIG. 10, the E8-VSB data attribute generator 705 includes a main and enhanced mux packet processor 801 receiving the E8-VSB map information of the current field and the field sync signal to output a 188-byte attribute packet containing the attribute information identifying the normal data, the ½-rate enhanced data or the ¼ rate enhanced data, a null ATSC RS coder 802 outputting a 207-byte attribute packet by discarding the first byte of an input packet corresponding to 0x47 MPEG sync byte and adding a parity amount of the ATSC RS coder, i.e. 20 bytes having the attribute of the normal data, to the 188-byte attribute packet, an ATSC data interleaver 803 interleaving the 207-byte attribute packet, and a byte-symbol converter 804 converting the interleaved data of byte unit to data of symbol unit to output as an attribute of E8-VSB data symbol. The E8-VSB symbol attribute is provided to the enhanced equalizer 604 and the Viterbi decoder 901 of the E8-VSB channel decoder/demultiplexer 606.

The above-configured E8-VSB data attribute generator 705, as shown in FIG. 10, generates the attribute information of each symbol in a manner of using the field sync signal and the E8-VSB map information of the current field.

Figure 12:
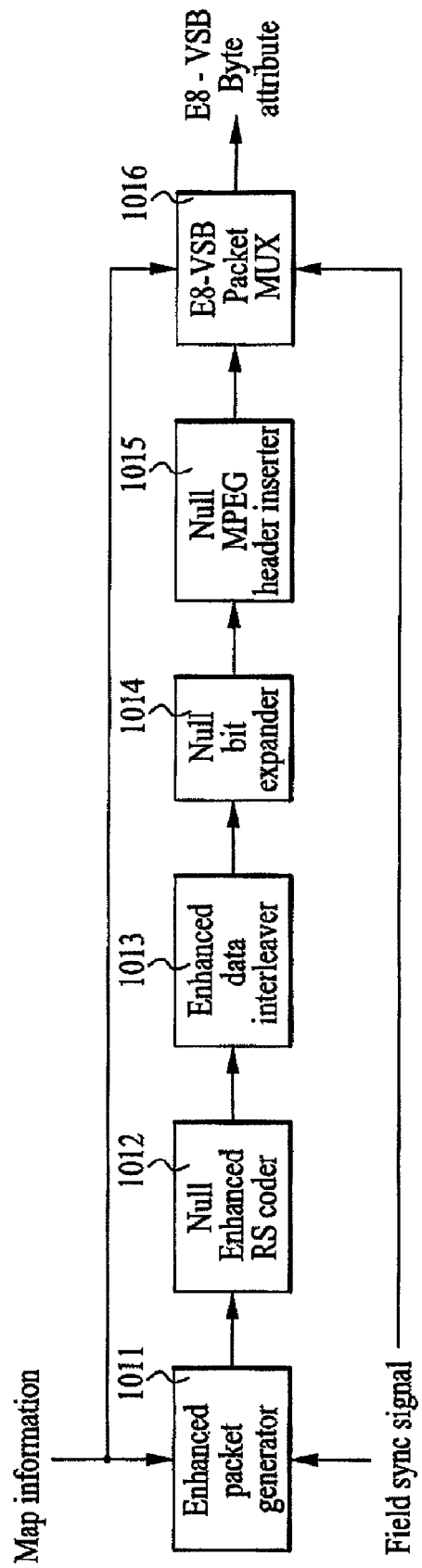
FIG. 12 is a detailed block diagram of a main and enhanced mux packet processor in FIG. 10 and FIG. 11.

Namely, the main and enhanced mux packet processor 801 receives the field sync signal and the E8-VSB map information of the current field to output the attribute packet constructed with 188 bytes to the null ATSC RS coder 802. The attribute packet contains no data information but the attribute information per byte. And, the attribute also enables to identify whether each byte is the byte of the normal data, the ½ enhanced data coded at ½ code rate, or the ¼ enhanced data coded at ¼ code rate. FIG. 12 is a detailed block diagram of the main and enhanced mux packet processor 801, which will be explained in detail later.

The null ATSC RS coder 802 outputs the 207-byte attribute packet to the ATSC data interleaver 803 by discarding the first byte of an input packet corresponding to 0x47 MPEG sync byte and adding the parity amount of the ATSC RC coder, i.e. 20 bytes having the attribute of the normal data, to the 188-byte attribute packet. The ATSC data interleaver 803 performs ATSC data interleaving on the 207-byte attribute packet to output to the byte-symbol converter 804. The byte-symbol converter 804 converts the interleaved data of byte unit to the data of symbol unit to output as an attribute of the E8-VSB data symbol. And, the E8-VSB data symbol attribute is provided to the enhanced equalizer 604 and the Viterbi decoder 901 of the E8-VSB channel decoder/demultiplexer 606.

The equalizer 604 receives each attribute of the currently inputted VSB symbol from the E8-VSB map recovery 605, thereby enabling to exert equalization capability more enhanced than that of the conventional equalizer. Moreover, by feeding back a symbol decision of the Viterbi decoder 901 of the E8-VSB channel decoder/demultiplexer 606 to the equalizer 604, it is able to enhance equalization performance. Namely, since the reliability of the enhanced symbol(s) is higher than that of the normal data symbol, the equalizer 604 enables to improve its equalization performance using the two kinds of information (i.e., E8-VSB data symbol attribute and symbol decision feedback from the Viterbi decoder 901).

Figure 11:
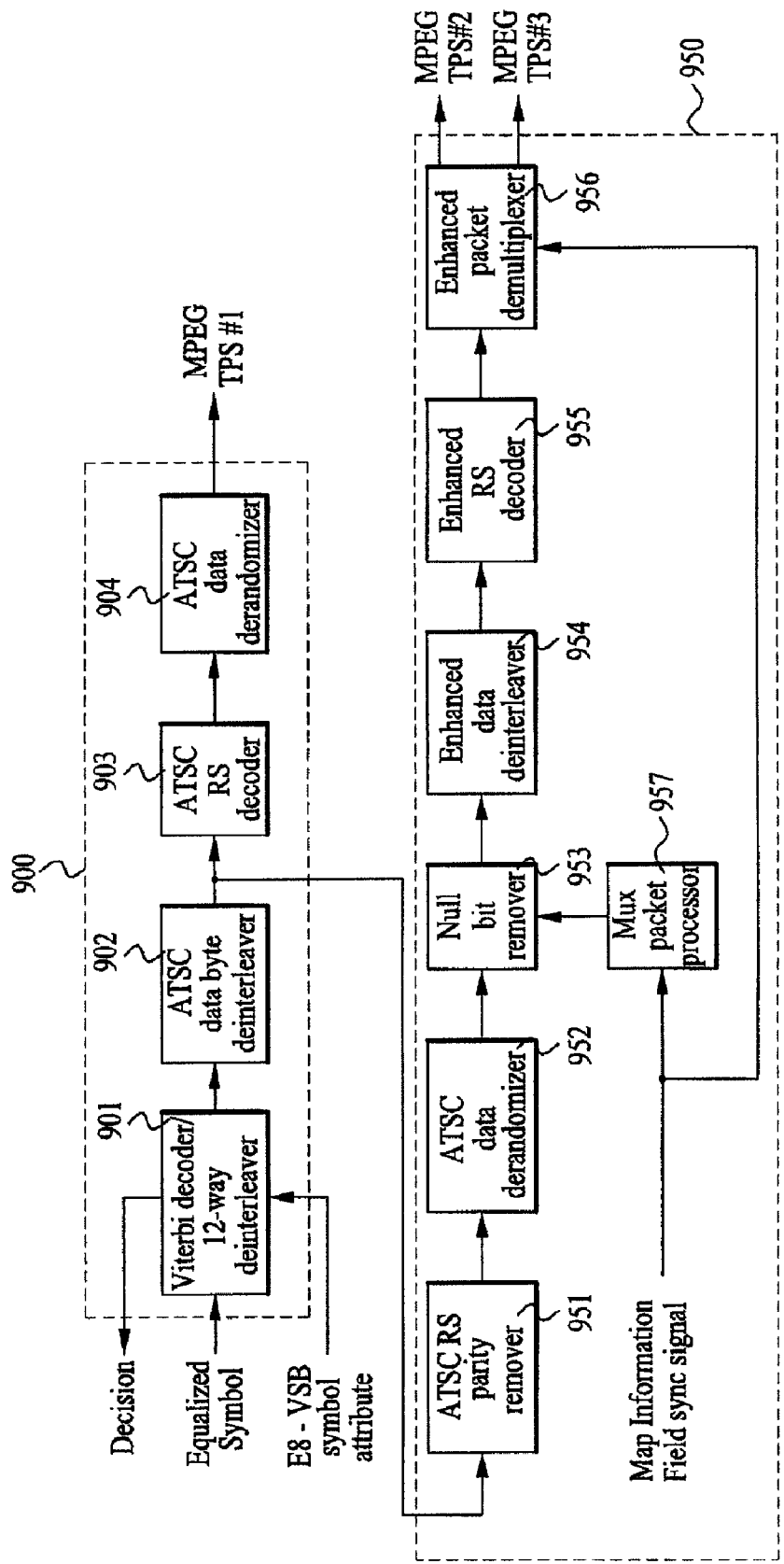

Meanwhile, the E8-VSB channel decoder/demultiplexer 606, as shown in FIG. 11, has a separate data path to receive an enhanced data as well as a normal data. Namely, by decoding or separating a reception signal in a corresponding mode using the E8-VSB map information and E8-VSB data attributes indicating the multiplexing information of the currently received E8-VSB signal, the E8-VSB reception system enables to receive a normal data MPEG TPS #1, ½ enhanced data MPEG TPS #2, and ¼ enhanced data MPEG TPS #3. In this case, the mode indicates one of normal data, the ½ enhanced data, and the ¼ enhanced data.

FIG. 11 is a detailed block diagram of the E8-VSB channel decoder/demultiplexer 606.

Referring to FIG. 11, the E8-VSB channel decoder/demultiplexer 606 includes a main data decoding unit 900 separating to decode the normal data MPEG TPS #1 from an equalized signal and an enhanced data decoding unit 950 separating to decode the enhanced data and separating the decoded data into the ½ enhanced data MPEG TPS #2 and the ¼ enhanced data MPEG TPS #3. The main data decoding unit 900 is the same as a channel decoder of the legacy ATSC receiver, but the difference is that the Viterbi decoder 901 of the main decoding unit 900 decodes both normal data and enhanced data using E8-VSB data attributes of symbol unit from E8-VSB data attribute generator 705. The enhanced data decoding unit 950 is a data path of decoding the ½ and ¼ enhanced data.

The main data decoding unit 900 includes a Viterbi decoder/12-way data interleaver 901, an ATSC byte deinterleaver 902, an ATSC RS decoder 903, and an ATSC data derandomizer 904.

Namely, as is the same case of the conventional 8VSB channel decoder, the normal data symbol equalized in the equalizer 604 is decoded into the normal data stream MPEG TPS #1 via the Viterbi decoder/12-way deinterleaver 901, ATSC data byte deinterleaver 902, ATSC RS decoder 903, and ATSC data derandomizer 904 of the main data decoding unit 900. The transmitted signal from the legacy ATSC 8VSB transmitter is decided as the signal having normal data only by the E8-VSB map recovery and can be received via the path of the main data decoding unit 900.

Yet, since the 8VSB signal and the enhanced VSB signal are multiplexed in case of the E8-VSB signal, there are two differences in the E8-VSB channel decoder/demultiplexer 606 compared to the conventional ATSC 8VSB channel decoder. One is that decoding appropriate for each E8-VSB symbol should be performed in the Viterbi decoder based on the attribute of E8-VSB symbol, and the other is that a separate data path for the enhanced data should exist.

The enhanced data decoding unit 950, which is the data path for decoding the enhanced data, includes an ATSC RS parity removing unit 951, an ATSC data derandomizer 952, a null-bit removing unit 953, an enhanced data deinterleaver 954, an enhanced RS decoder 955, an enhanced packet demultiplexer 956, and a main and enhanced mux packet processor 957.

Considering the E8-VSB channel decoder/demultiplexer 606 in FIG. 11, the E8-VSB symbol equalized in the equalizer 604 and the E8-VSB data symbol attribute generated from the E8-VSB map recovery 605 are synchronized to be inputted to the Viterbi decoder/12-way deinterleaver 901.

In doing so, since the normal symbol and the enhanced symbol are mixed in the equalized symbol inputted to the Viterbi decoder/12-way deinterleaver 901, the Viterbi decoder/12-way deinterleaver 901 identifies the normal symbol and the enhanced symbol from each other based on the E8-VSB data symbol attribute and then performs Viterbi decoding correspondingly. And, the Viterbi decoder/12-way deinterleaver 901 performs deinterleaving to output a result of byte unit to the ATSC data byte deinterleaver 902. And, 8-level decision value from the Viterbi decoder during decoding is fed back to the equalizer 604. The ATSC data byte deinterleaver 902 deinterleaves the data of byte unit outputted from the Viterbi decoder/12-way deinterleaver 901.

Namely, the ATSC data byte deinterleaver 902 outputs the data of byte unit in a manner of performing deinterleaving on the output of the Viterbi decoder/12-way deinterleaver 901 according to a process reverse to that of the ATSC byte interleaver in FIG. 3. The deinterleaved data can be divided into 188-byte packet units and can be separated into a normal data packet and an enhanced data packet. The data outputted from the ATSC data byte deinterleaver 902 is identically inputted to the ATSC RS decoder 903 and the ATSC RS parity removing unit 951 of the enhanced data decoding unit 950.

The ATSC RS decoder 903 performs RS decoding on the data packet, which is the output of the ATSC data byte deinterleaver 902, according to a process reverse to that of the ATSC RS coder in FIG. 3, and then outputs the result to the ATSC data derandomizer 904.

The output of the ATSC data derandomizer 904 is finally outputted as an MPEG TPS #1. Since the enhanced data packets are encapsulated with null PID, the enhanced packets multiplexed in the output of the data derandomizer 904 can be discarded, and so there is no problem in receiving normal packets in the conventional AV (audio/video) decoder.

The ATSC RS parity removing unit 951 of the enhanced data decoding unit 950 removes an ATSC RS party portion from the output of the ATSC data byte deinterleaver 902 and then outputs the result to the ATSC data derandomizer 952. Namely, since the ATSC parity portion is not used in the enhanced data decoding, it can be removed.

The ATSC data derandomizer 952 derandomizes the data of which ATSC RS parity portion was removed in a process reverse to that of the ATSC randomizer 302-1 in FIG. 3 and then outputs the result to the null-bit removing unit 953.

The E8-VSB data attribute generator 705 identifies whether the output from the ATSC data derandomizer 952 is a normal data byte or en enhanced data byte. If it is the byte for enhanced data, the E8-VSB data attribute generator 705 further identifies whether the enhanced data byte is a byte for the ½ enhanced data or a byte for the ¼ enhanced data. The null-bit removing unit 953 removes the entire normal data bytes (including MPEG header bytes added to an enhanced data packet) and the null bits inserted to the enhanced data byte to reconfigure meaningful bytes and then outputs the reconfigured bytes to the enhanced data deinterleaver 954. In doing so, the VSB byte attribute information outputted from the main and enhanced mux packet processor 957 enables to identify whether each byte is for the normal data stream, the ½ enhanced data byte, or the ¼ enhanced data byte.

Figure 13:
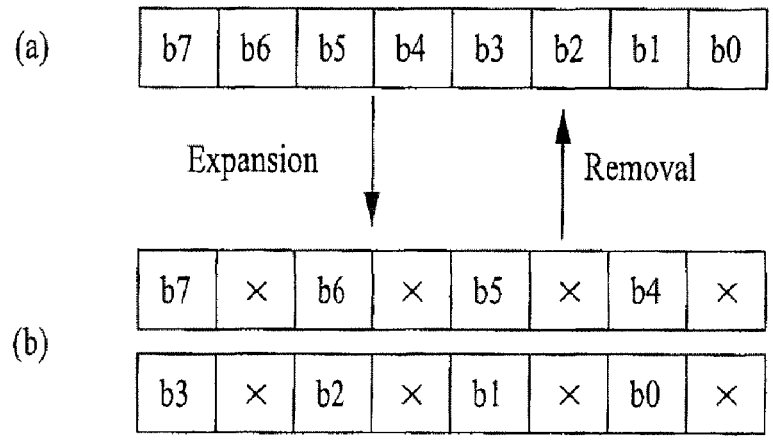
FIG. 13 is a diagram of byte expansion and removal of ½ enhanced data.
Figure 14:
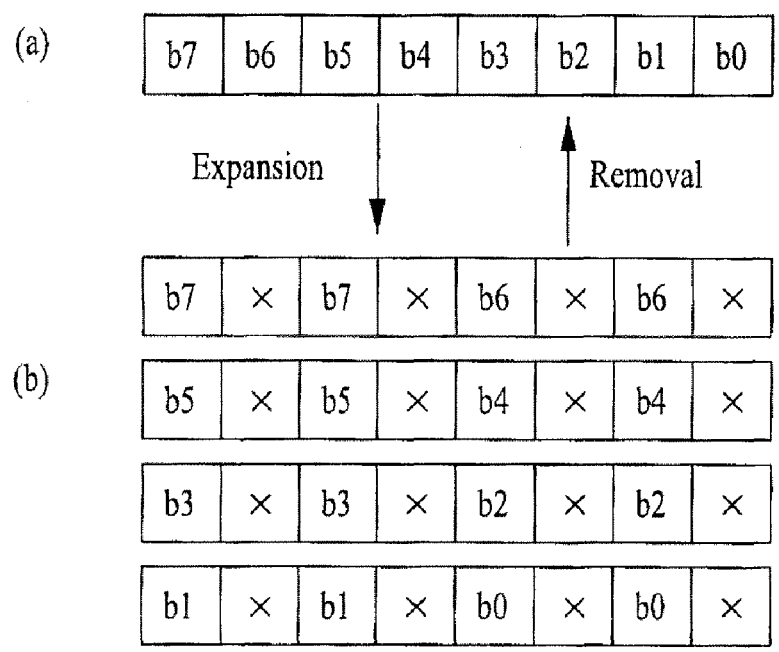
FIG. 14 is a diagram of byte expansion and removal of ¼ enhanced data.

First of all, in case of the normal data byte, the respective bits are completely removed. In doing so, having the attribute of normal data, the MPEG header inserted in the ½ or ¼ enhanced data packet is removed as well. Meanwhile, in case of the enhanced data byte, reconfigurations are performed as shown in FIG. 13 and FIG. 14. Hence, the null-bit removing unit 953 ignores the normal data and outputs the null-bit removed ½ and ¼ enhanced data only.

Namely, in case of the ½ enhanced data, since one byte, as shown in (b) of FIG. 13, is expanded to 2 bytes by inserting the null bits in the E8-VSB transmission system, the insignificant bits (i.e., null bits) are removed in (b) of FIG. 13 to reconfigure one significant byte in (a) of FIG. 13. In case of the ¼ enhanced data, each bit, as shown in (b) of FIG. 14, is repeated and null-bits are inserted for a 4-byte expansion. Hence, the insignificant bits (i.e. repeated bits and null bits)

are removed from (b) of FIG. 14 to reconfigure the four consecutive ¼ enhanced data bytes into one significant byte shown in (a) of FIG. 14.

The enhanced data deinterleaver 954 performs deinterleaving on enhanced data byte consisting of significant bits outputted from the null-bit removing unit 953 in a manner reverse to that of the enhanced data interleaver 505 in FIG. 6 and then outputs the deinterleaved data to the enhanced RS decoder 955. The enhanced RS decoder 955 performs decoding on the deinterleaved data in a manner reverse to that of the enhanced RS coder 504 in FIG. 6 and then outputs the decoded data to the enhanced packet demultiplexer 956.

The enhanced packet demultiplexer 956 separates the enhanced RS decoded data into a ½ enhanced data packet of 164-byte unit and a ¼ enhanced data packet of 164-byte unit using the E8-VSB map information and field sync signal outputted from the E8-VSB map recovery 605 and then outputs them as MPEG TPS #2 and MPEG TPS #3, respectively. The separation scheme is explained with reference to FIG. 15 and a method of generating the enhanced packet having the enhanced data attribute information is explained with reference to the enhanced packet generator in FIG. 12. Thus, by receiving the E8-VSB signal, it is able to receive the normal data MPEG TPS #1, the ½ enhanced data MPEG TPS #2, and the ¼ enhanced data MPEG TPS #3.

Namely, the main and enhanced mux packet processor 801 in FIG. 10 performs the same operation of the main and enhanced mux packet processor 957 in FIG. 11. The corresponding detailed diagram of the main and enhanced mux packet processor is shown in FIG. 12.

In the present invention, the main and enhanced mux packet processors are provided to the E8-VSB data attribute generator 705 and the E8-VSB channel decoder/demultiplexer 606, respectively. Alternatively, one main and enhanced mux packet processor is provided to the present invention so that an output of the main and enhanced mux packet processor can be used in both the E8-VSB data attribute generator 705 and the E8-VSB channel decoder/demultiplexer 606.

FIG. 12 is a detailed block diagram of the main and enhanced mux packet processor 801 or 957.

The main and enhanced mux packet processor generates attribute information of E8-VSB data of byte unit using the E8-VSB map information of the current field decided by the current map deciding unit 703 of the E8-VSB map recovery 605 and the field sync signal recovered by the frame sync recovery 704. The attribute information of E8-VSB data of byte unit provides information of whether the current byte is the normal data byte or the enhanced data byte. If the current byte is the enhanced VSB byte, the attribute information also provides information of whether the enhanced data byte is the ½ enhanced data byte coded at ½ code rate or the ¼ enhanced data byte coded at ¼ code rate.

For this, the main and enhanced mux packet processor includes an enhanced packet generator 1011, a null enhanced RS coder 1012, an enhanced data interleaver 1013, a null-bit expander 1014, a null MPEG header inserter 1015, and a main and enhanced packet multiplexer 1016.

Figure 15A:
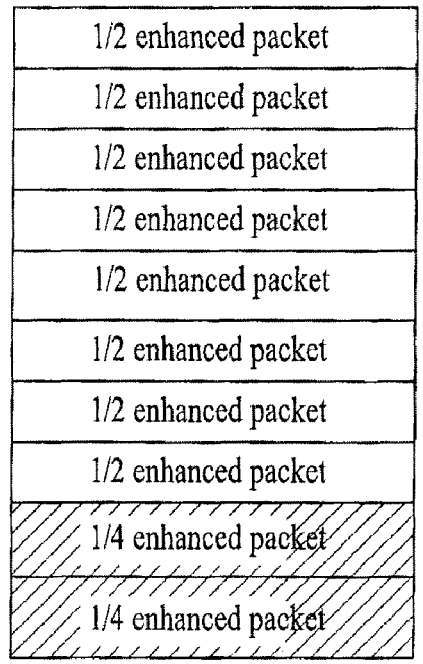
FIG. 15A is a diagram of a group distribution in multiplexing ½ enhanced data packets and ¼ enhanced data packets.
Figure 15B:
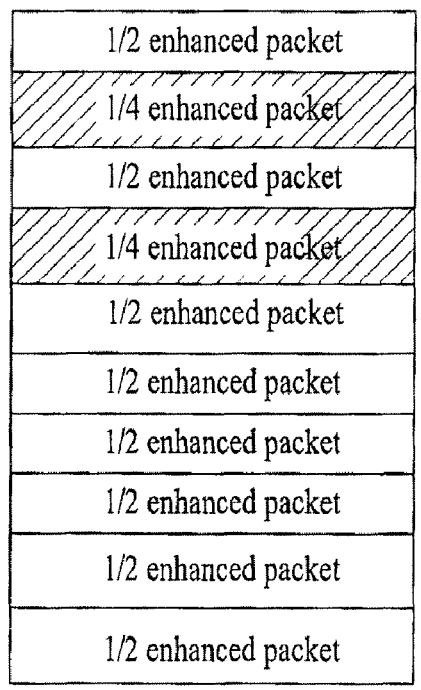
FIG. 15B is a diagram of an alternative distribution in multiplexing ½ enhanced data packets and ¼ enhanced data packets.

Namely, the enhanced packet generator 1011 generates an attribute packet having the attribute information of whether the enhanced data is the ½ enhanced data or the ¼ enhanced data. By the E8-VSB map information of the current field, the distributions and rates of the ½ and ¼ enhanced data packets of the current field are determined. In accordance with the two distribution types, FIG. 15A and FIG. 15B show a case that the number of packets of the ½ enhanced data is eight and the number of packets of the ¼ enhanced data is two. Namely, FIG. 15A shows an example that the ½ enhanced data packets and the ¼ enhanced data packets are separately grouped to be multiplexed (grouping multiplexing) and FIG. 15B shows an example that the ½ enhanced data packets and the ¼ enhanced data packets are alternately multiplexed one by one (alternate multiplexing).

In doing so, the enhanced packet generator 1011 generates an attribute signal for whether each enhanced packet has the attribute of ½ or ¼ rather than a signal including significant data. The attribute signal enables to output an attribute of E8-VSB data byte via the null enhanced RS coder 1012, enhanced data interleaver 1013, null bit expander 1014, null MPEG header inserter 1015, and main and enhanced packet multiplexer 1016.

Namely, an attribute packet of 164 bytes having the attribute information of the enhanced data outputted from the enhanced packet generator 1011 is inputted to the null enhanced RS coder 1012. The null enhanced RS coder 1012 adds a parity of 20 bytes to the received attribute packet of 164 bytes to output an attribute packet of 184 bytes. In doing so, the parity added to the parity area is for justification. Hence, the attribute of each packet is copied as many as a parity amount for expansion. Namely, although the parity generated from performing substantial enhanced RS coding is added in a normal data path, the expansion is performed by the null enhanced RS coder 1012 in a manner of copying the attribute of each packet to the parity area as many as the parity amount.

An output of the null enhanced RS coder 1012 is inputted to the enhanced data interleaver 1013 for interleaving and the interleaved output is outputted to the null bit expander 1014. The interleaving is achieved in the same manner of the enhanced data interleaver 505.

The null bit expander 1014, as shown in FIG. 13 or FIG. 14, expands the interleaved byte outputted from the enhanced data interleaver 1013 to fit the ½ or ¼ enhanced data. Namely, if the byte from the enhanced data interleaver 1013 is the byte having the ½ attribute information and has the configuration shown in (a) of FIG. 13) the null bit expander 1014, as shown in (b) of FIG. 13, inserts null bits in the byte to expand to two bytes. If the byte from the enhanced data interleaver 1013 is the byte having the ¼ attribute information and has the configuration shown in (a) of FIG. 14, the null bit expander 1014 performs bit repetition and null bit insertion to expand the byte to 4 bytes. The null bit expander 1014 then outputs the expanded bytes to the null MPEG header inserter 1015. In doing so, since the expanded byte means the attribute of the enhanced data, values of b7 to b0 are identical to each other unlike the null bit expander of the transmitter.

The null MPEG header inserter 1015 adds a value, which indicates the normal data byte corresponding to an MPEG header, in front of each 184 bytes outputted from the null bit expander 1014 and then outputs the corresponding result to the main and enhanced packet multiplexer 1016. The main and enhanced packet multiplexer 1016, which Outputs packets by 188-byte Unit, multiplexes the normal data packets and the enhanced data packets to output. In doing so, the main and enhanced packet multiplexer 1016 seeks the number H of the ½ enhanced data packets of 188-byte unit and the number Q of the ¼ enhanced data packets of 188-byte unit from the E8-VSB map information based on the field sync signal outputted from the E8-VSB map recovery 605 and then finds the number 2P of packets of 188-byte unit allocated to the enhanced data per one VSB field (2P=2H+4P).

The main and enhanced packet multiplexer 1016 multiplexes the normal data packets and the enhanced data packets using a multiplexing rule based on the distribution method selected in the E8-VSB map information. For example, if a pattern distribution method is selected, the multiplexing rule shown in FIG. 16A may be used. In this rule, positions of the enhanced data packet in a data field are assigned to every fourth segment starting from at least one predetermined start position (segment position 0, 2, 1, and/or 3) within the data field.

On the other hand, if an even (uniform) distribution method is selected, the multiplexing rule shown in FIG. 16B may be used. "s" shown in both rules denotes a packet (or segment before ATSC byte interleaving) position for an enhanced data packet with respect to a field synchronizing signal within the data field. By outputting a signal indicating the normal data byte in case of a normal data packet or outputting a signal from the null MPEG header inserter 1015 in case of an enhanced data packet, the final E8-VSB data byte attribute is outputted.

As mentioned in the foregoing description of the digital E8-VSB reception system and E8-VSB data demultiplexing method according to the present invention, the enhanced data are coded at ½ code rate and ¼ code rate in the new E8-VSB transmission system compatible with the conventional ATSC 8VSB system, respectively. The ½ and ¼ enhanced data are multiplexed by 164-byte packet unit according to the previously determined multiplexing format and further pre-processed to output as the format of the MPEG transport packet. And, the pre-processed enhanced data and the main data are multiplexed again by 188-byte packet unit according to the previously determined multiplexing format. In such a case, the E8-VSB reception system according to the present invention enables to completely receive both of the ATSC 8VSB signal and the E8-VSB signal.

Moreover, the E8-VSB map information, which was inserted in the field sync section in the E8-VSB transmission system to be transmitted, is extracted to generate the information indicating the attributes of the respective E8-VSB data. The normal data, ½ enhanced data, and ¼ enhanced data are separated from each other to be decoded in the channel decoder. And, the E8-VSB data symbol attribute is used in channel equalization. Therefore, the present invention improves the performance of the equalizer, thereby enabling to enhance the performance of the E8-VSB reception system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of processing a digital television (DTV) signal in a DTV receiver, the method comprising:
receiving the DTV signal through an antenna, the DTV signal comprising enhanced data and main data;
demodulating the received DTV signal;
channel equalizing the demodulated DTV signal; and
trellis decoding channel-equalized DTV signal,
wherein the DTV signal is generated in a DTV transmitter, and
wherein generating the DTV signal in the DTV transmitter comprises:
randomizing enhanced data;
first Reed-Solomon (RS) encoding the randomized enhanced data;
convolutional encoding the first RS-encoded enhanced data;
deinterleaving the convolutional encoded enhanced data;
second RS encoding the deinterleaved enhanced data;
interleaving the second RS-encoded enhanced data;
trellis encoding the interleaved enhanced data; and
transmitting the DTV signal comprising the trellis-encoded enhanced data.

2. The method of claim 1, further comprising:
deinterleaving the enhanced data in the trellis-decoded DTV signal; and
RS decoding the deinterleaved enhanced data.

3. A digital television (DTV) receiver, comprising:
an antenna;
a tuner for receiving a DTV signal through the antenna, the DTV signal comprising enhanced data and main data;
a demodulator for demodulating the received DTV signal;
an equalizer for channel equalizing the demodulated DTV signal; and
a decoder for trellis decoding the channel-equalized DTV signal,
wherein the DTV signal is generated in a DTV transmitter that is configured to:
randomize enhanced data;
first Reed-Solomon (RS) encode the randomized enhanced data;
convolutional encode the first RS-encoded enhanced data;
deinterleave the convolutional encoded enhanced data;
second RS encode the deinterleaved enhanced data;
interleave the second RS-encoded enhanced data;
trellis encode the interleaved enhanced data; and
transmit the DTV signal comprising the trellis-encoded enhanced data.

4. The DTV receiver of claim 3, further comprising:
a deinterleaver for deinterleaving the enhanced data in the trellis-decoded DTV signal; and
an RS decoder for RS decoding the deinterleaved enhanced data.

5. A method of processing a digital television (DTV) signal in a DTV transmitter, the method comprising:
randomizing enhanced data;
first Reed-Solomon (RS) encoding the randomized enhanced data;
convolutional encoding the first RS-encoded enhanced data;
deinterleaving the convolutional encoded enhanced data;
second RS encoding the deinterleaved enhanced data;
interleaving the second RS-encoded enhanced data;
trellis encoding the interleaved enhanced data; and
transmitting the DTV signal comprising the trellis-encoded enhanced data and main data.

6. A digital television (DTV) transmitter, comprising:
a randomizer for randomizing enhanced data;
a first Reed-Solomon (RS) encoder for first RS encoding the randomized enhanced data;
a convolutional encoder for convolutional encoding the first RS-encoded enhanced data;
a deinterleaver for deinterleaving the convolutional encoded enhanced data;
a second RS encoder for second RS encoding the deinterleaved enhanced data;
an interleaver for interleaving the second RS-encoded enhanced data;
a trellis encoder for trellis encoding the interleaved enhanced data; and
a transmitting unit for transmitting a DTV signal comprising the trellis-encoded enhanced data and main data.

* * * * *